United States Patent
Kamperschroer

(10) Patent No.: US 6,434,399 B1
(45) Date of Patent: Aug. 13, 2002

(54) METHOD FOR SUBSCRIBING TELECOMMUNICATIONS DEVICES AT COOPERATING STATIONS BY WIRELESS TELECOMMUNICATION

(75) Inventor: Erich Kamperschroer, Hamminkeln (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/508,724

(22) PCT Filed: Aug. 27, 1998

(86) PCT No.: PCT/DE98/02528

§ 371 (c)(1),
(2), (4) Date: Mar. 15, 2000

(87) PCT Pub. No.: WO99/14969

PCT Pub. Date: Mar. 25, 1999

(30) Foreign Application Priority Data

Sep. 15, 1997 (DE) .......................... 197 40 561

(51) Int. Cl.$^7$ ................................. H04B 7/06
(52) U.S. Cl. ................. 455/524; 455/452; 455/525; 370/332; 370/333
(58) Field of Search .............. 455/524, 525, 455/403, 418, 414, 952, 226.1, 226.2, 552, 428, 509; 370/330, 331, 332, 333

(56) References Cited

U.S. PATENT DOCUMENTS

| | | | |
|---|---|---|---|
| 5,471,671 A | | 11/1995 | Wang et al. |
| 6,195,548 B1 | * | 2/2001 | Schultheiss .................. 455/419 |
| 6,263,203 B1 | * | 7/2001 | Jahn ............................ 370/332 |
| 6,272,118 B1 | * | 8/2001 | Wewers et al. .............. 370/330 |
| 6,301,483 B1 | * | 10/2001 | Israelsson .................... 455/434 |
| 6,314,299 B1 | * | 11/2001 | Schreib et al. .............. 455/411 |
| 6,321,096 B2 | * | 11/2001 | Lautenschlager et al. ... 455/426 |
| 6,345,184 B1 | * | 2/2002 | van der Salm et al. ..... 455/414 |

FOREIGN PATENT DOCUMENTS

WO     WO 96/38990     12/1996

OTHER PUBLICATIONS

European Telecommunication Standard Draft pr ETS 300 822 pp. 1–116.
European Telecommunication Standard Draft ETS 300 824 pp. 1–40.

* cited by examiner

Primary Examiner—William Trost
Assistant Examiner—Congvan Tran
(74) Attorney, Agent, or Firm—Bell, Boyd & Lloyd LLC

(57) ABSTRACT

In order to improve the subscribing of telecommunication devices at cooperating stations connectable to the telecommunication devices by wireless telecommunication in wireless telecommunication systems, particularly DECT mobile parts at DECT base stations in DECT systems, all base stations transmitting received radio messages that have set and transmitted the "a44" bit are stored as in the mobile part, and a known log on procedure is implemented with a base station selected according to predetermined reception criteria. When this log on procedure miscarries, then this base station is marked as "invalid" and the same procedure, including the log on procedure, is implemented with a different base station. What is thereby utilized is that, in the log on, a PIN word and/or an AC word is interrogated. When the PIN word/AC word is incorrect, then the log on attempt is rejected. Otherwise, when the PIN word/AC word is correct, the mobile part has been successfully logged on at the base station.

11 Claims, 6 Drawing Sheets

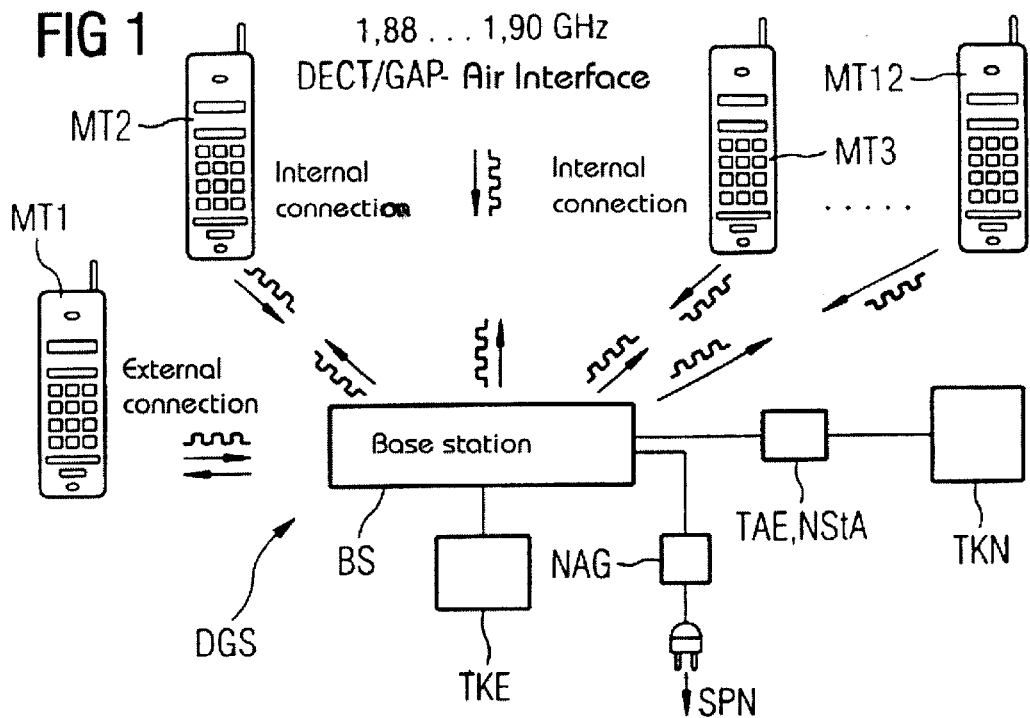
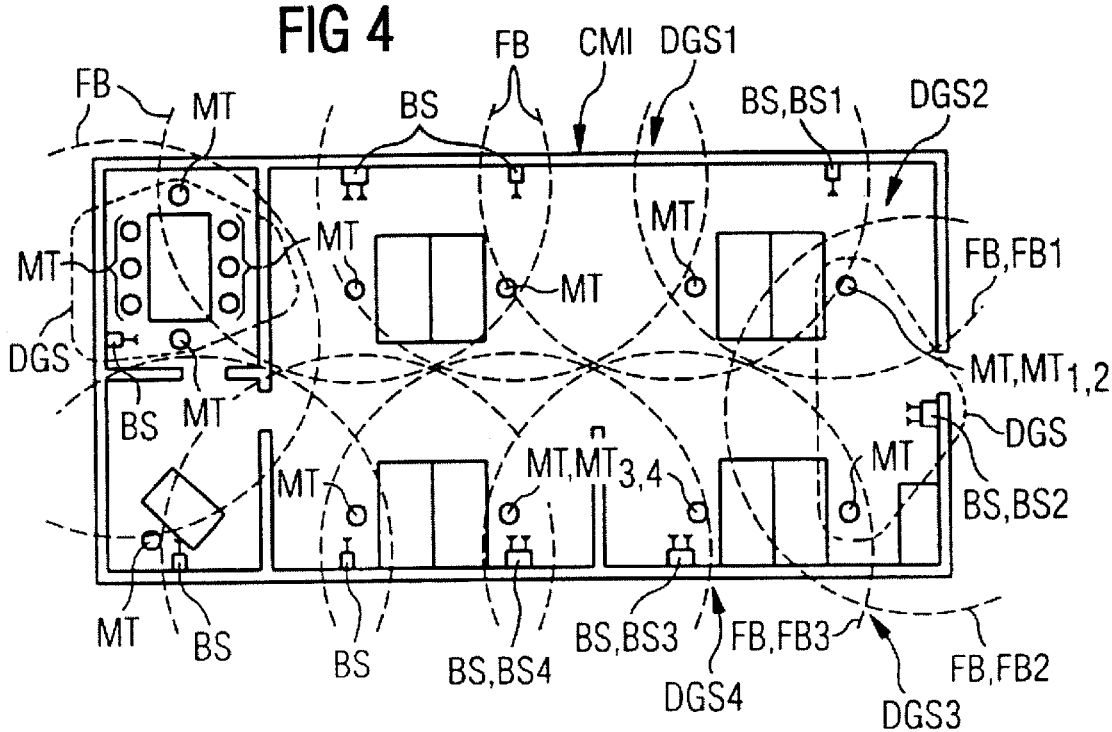

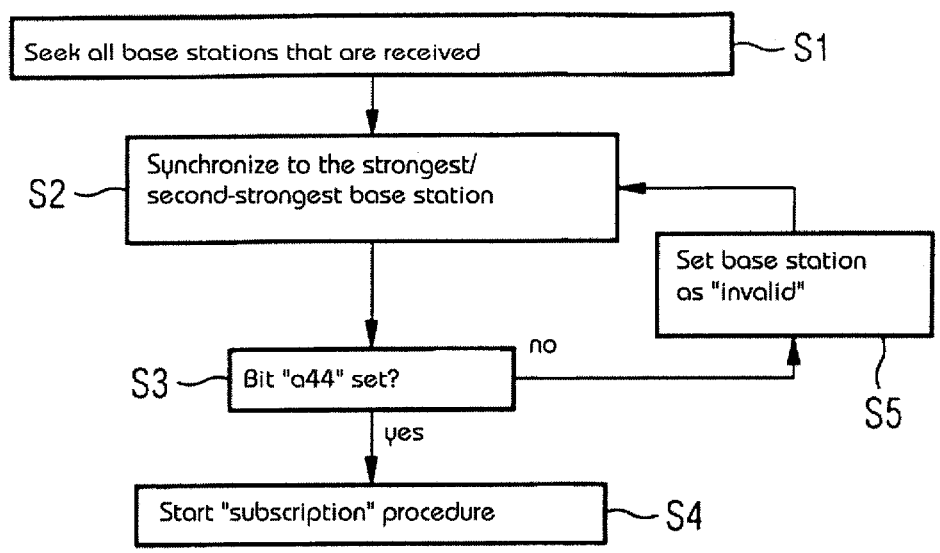
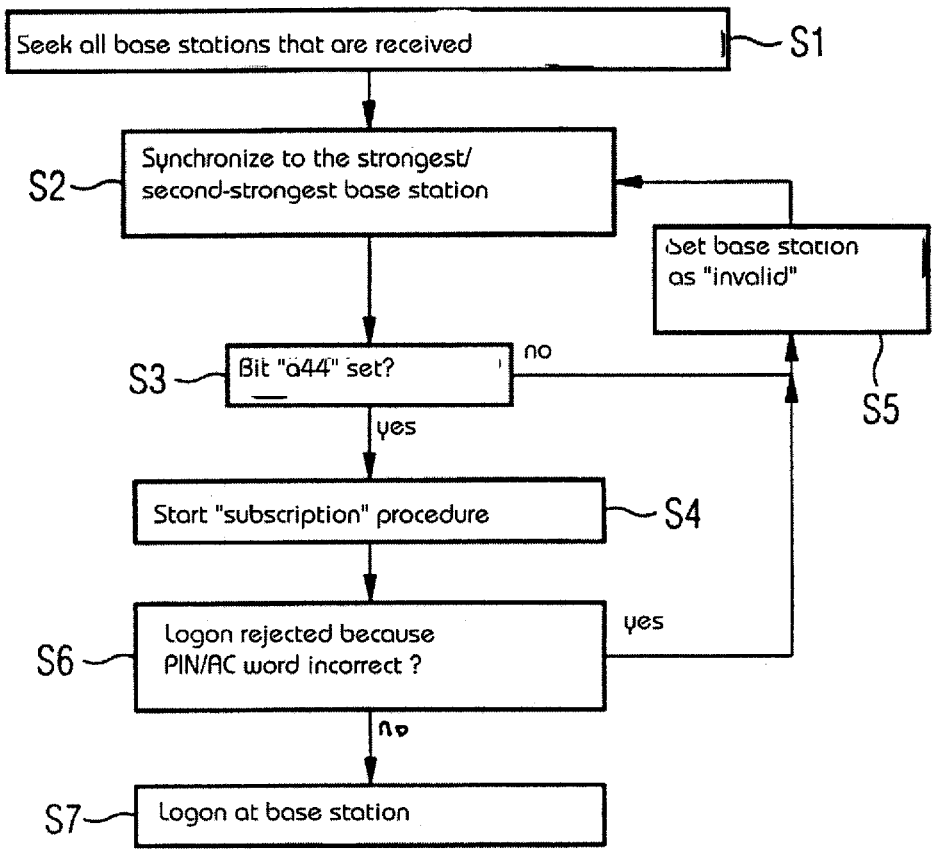

METHOD FOR SUBSCRIBING TELECOMMUNICATIONS DEVICES AT COOPERATING STATIONS BY WIRELESS TELECOMMUNICATION

BACKGROUND OF THE INVENTION

1. Field of the Invention

The present invention relates to methods for subscribing telecommunications devices at cooperating stations connectable to the telecommunication devices by wireless telecommunication in wireless telecommunication system, particularly DECT mobile parts at DECT base stations in DECT systems.

In message systems with a message transmission link between a message source and a message sink, transmission and reception devices are employed for processing and transmission, of the message wherein 1) the message processing and message transmission can occur in a privileged transmission direction (simplex mode) or in both transmission directions (duplex mode);
2) the message processing is analog or digital;
3) the message transmission via the long-distance transmission link either is wire-bound or occur wirelessly on the basis of various message transmission methods FDMA (Frequency Division Multiple Access) and/or CDMA (Code Division Multiple Access); for example according to radio standards such as DECT, GSM, WACS or PACS, IS-54, PHS, PDC, etc. [see IEEE Communications Magazine, January 1995, pages 50 through 57; D. D. Falconer et al., "Time Division Multiple Access Methods for Wireless Personal Communication"].

"Message" is a higher-ranking term that stands both for the signification (information) and for the physical representation (signal). Despite the same signification of a message (i.e., the same information), different signal forms can occur. Thus, for example, a message relating to a subject matter can be transmitted:

(1) in the form of an image;
(2) as a spoken word;
(3) as a written word; or
(4) as an encrypted word or image. The transmission mode according to (1) . . . (3) is, thereby, normally characterized by continuous (analog) signals, whereas discontinuous signals (for example, pulses, digital signals, etc.) usually arise given the transmission mode according to (4).

Telecommunication systems in the above-defined field are, for example, DECT systems [Digital Enhanced (previously: European) Cordless Telecommunication; see (1): Nachrichtentechnik Elektronik 42 (1992) January February No. 1, Berlin, DE; U. Pilger, "Struktur des DECT-Standards" pages 23 through 29 in conjunction with the ETSI Publication ETS 300175-1 . . . 9, October 1992; (2): Telcom Report 16 (1993), No. 1, J. H. Koch, "Digitaler Komfort für schnurlose Telekommunikation—DECT-Standard eröffnet neue Nutzungsgebiete", pages 26 and 27; (3): tec 2/93—the technical magazine of Ascom, "Wege zur universellen mobilen Telekommunikation", pages 35 through 42; (4): Philips Telecommunication Review, Vol.49, No.3, September 1991, R. J. Mulder, "DECT, a universal cordless access system"; (5) WO 93/21719 (FIGS. 1 through 3 with appertaining description)] or GAP systems (Generic Access Profile; see ETSI Publication ETS 300444, December 1995, ETSI, FR). The GAP standard is a subset of the DECT standard that has the job of assuring the interoperability of the DECT air interface for telephone applications.

According to the DECT/GAP standard, it is possible, in accordance with the illustration in FIG. 1, to set up at a DECT/GAP base station ES a maximum of 12 connections according to the TDMA/FDMA/TDD method (Time Division Multiple Access/Frequency Division Multiple Access/Time Division Duplex) in parallel to DECT/GAP mobile parts MT1 . . . MT12 over a DECT/GAP air interface configured for the frequency range between 1.88 and 1.90 GHz. The number 12 results from the number "k" of time slots or telecommunications channels (k=12) available for the duplex mode of a DECT/GAP system. The connections here may be internal and/or external. When there is an internal connection, two mobile parts registered at the base station ES, for example the mobile part MT2 and the mobile part MT3, can communicate with one another. To set up an external connection, the base station ES is connected to a telecommunications network TKN; for example, in line-bound form via a telecommunications connection unit TAE and/or a private branch exchange system NStA with a line-bound telecommunications network or, in accordance with WO 95/05040, in wireless form as a repeater station with a superordinate telecommunications network. When there is an external connection, it is possible to use a mobile part, for example the mobile part MT1, to communicate with a subscriber in the telecommunications network TKN via the base station BS, the telecommunications connection unit TAE or the private branch exchange system NStA. If the base station BS has, as in the case of the Gigaset 951 (Siemens cordless telephone, cf. Telcom report 16, (1993) Issue 1, pages 26 and 27), only one connection to the telecommunications connection unit TAE and/or to the private branch exchange system NStA, only one external connection can be set up. If the base station ES has, as in the case of the Gigaset 952 (Siemens cordless telephone; cf. Telcom report 16, (1993), issue 1, pages 26 and 27), two connections to the telecommunications network TKN, a further external connection, in addition to the external connection to the mobile part MT1, is possible from a line-bound telecommunications terminal TKE which is connected to the base station BS. In this context, it is also possible conceivable for a second mobile part, for example the mobile part MT12, to use the second port for an external connection, instead of the telecommunications terminal TKE. While the mobile parts MT1 . . . MT12 are operated with a battery or an accumulator, the base station BS which is designed as a cordless small-scale exchange is connected to a voltage network SPN via a mains connection unit NAG.

FIG. 2 shows, on the basis of the publication Components 31 (1993), Issue 6, pages 215 to 218; S.Althammer, D. Brückmann: "Hochoptimierte IC's fur DECT-Schnurlostelefone", the basic circuitry design of the base station BS and the mobile part MT. According to the latter, the base station BS and the mobile part MT have a radio component FKT with an antenna ANT which is assigned to transmitting and receiving radio signals, a signal processing device SVE and a central controller ZST which are connected to one another in the illustrated way. The radio component FKT basically contains known devices such as a transmitter SE, a receiver EM and a synthesizer SYN. The signal processing device SVE contains, inter alia, a coding/decoding device CODEC. The central controller ZST has a microprocessor µP both for the base station BS and for the mobile part NT, a program module PGM, set up according to the OSI/ISO layer model [cf. (1):

Unterrichtsblätter—Deutsche Telekom, Vol. 48, 2/1995, pages 102 to 111; (2): ETSI publication ETS 300175-1 . . . 9, October 1992], a signal control component SST and a digital signal processor DSP, which are connected to one another in the way illustrated. Of the layers defined in the layer model, only the directly essential first four layers are illustrated for the base station BS and the mobile part MT. The signal control component SST is designed as a Time Switch Controller TSC in the base station BS and as a Burst Mode Controller BMC in the mobile part MT. The essential difference between the two signal control components TSC, BMC is that the base station-specific signal control component TSC additionally assumes switching functions in comparison with the mobile part-specific signal control component BMC.

The principal method of operation of the circuit units specified above is described, for example, in the publication Components 31 (1993), Issue 6, pages 215 to 218, cited above. The described circuitry design according to FIG. 2 is supplemented in the base station BS and the mobile part MT in accordance with their function in the DECT/GAP system according to FIG. 1 via additional function units.

The base station BS is connected to the telecommunications network TKN via the signal processing device SVE and the telecommunications connection unit TAX or the private branch exchange system NStA. As an option, the base station BS also can have a user interface (functional units shown with broken lines in FIG. 2), which includes, for example, an input device EE designed as a keypad, a display device AZ designed as a display, a hand-held unit SHE designed as a handset with microphone MIF and earphone HK, as well as a ringer TRK. The mobile part MT has a user interface which is possible with the base station BS as an option and which has the control elements described above, which are associated with this user interface.

FIG. 3 shows, based on the publication "Nachrichtentechnik Elektronik 42 (1992) January February No. 1, Berlin, DE; U. Pilger: "Struktur des DECT-Standards", pages 23 to 29 in conjunction with ETS 300175-1 . . . 9, October 1992", the TDMA structure of the DECT/GAP system DGS. The DECT/GAP system is a hybrid system in terms of the multiple access methods in which, in accordance with the FDMA principle, it is possible to transmit radio telecommunications on ten frequencies in the frequency band between 1.88 and 1.90 GHz from the base station BS to the mobile part MT and from the mobile part MT to the base station BS (Time Division Duplex Mode) according to the TDMA principle in accordance with FIG. 3 in a prescribed time sequence. The time sequence is determined here by a multiple time frame MZR, which occurs every 160 ms and which has 16 time frames ZR, each with a time period of 10 ms. Information which relates to a C-, M-, N-, P-, or Q-channel defined in the DECT Standard is transmitted separately to the base station BS and mobile part MT in these time frames ZR. If information for a plurality of these channels is transmitted in one time frame ZR, the transmission takes place according to a priority list where M>C>N and P>N. Each of the 16 time frames ZR of the multiple time frame MZR is divided, in turn, into 24 time slots ZS. Each of these time slots ZS has a time period of 417 µs, of which 12 time slots ZS (time slots 0 . . . 11) are intended for the transmission direction "base station BS→mobile part NT" and a further 12 time slots ZS (time slots 12 . . . 23) are intended for the transmission direction "mobile part MT→base station BS". In each of these time slots ZS, information with a bit length of 480 bits is transmitted in accordance with the DECT Standard. Of these 480 bits, 32 bits are transmitted as synchronization information in a SYNC field and 388 bits are transmitted as payload information in a D field. The remaining 60 bits are transmitted as additional information in a Z field and as protective information in a "guard time" field. The 388 bits of the D field which are transmitted as useful information are in turn divided into a 64 bit-long A field, a 320 bit-long B field and a 4 bit-long "X-CRC" word. The 64 bit-long A field is composed of an 8 bit-long data header, a 40 bit-long data record with data for the C-, Q-, M-, N-, P- channels and a 16 bit-long "A-CRC" word.

FIG. 4 shows, taking the DECT system of FIG. 1 as a starting point, a cellular DECT/GAP multisystem CMI (Cordless Multicell Integration) in which a number of the DECT/GAP systems DGS described above, each with one base station ES and one or more mobile parts MT, are present at a given geographical location; for example, concentrated in a "hot spot" arrangement in an administration building with large open-plan offices. However, instead of an "enclosed" geographical location, such as the administration building, an "open" geographical location with strategic telecommunication significance, for example squares in large cities with a high traffic volume, a large collection of commercial units and large volumes of people moving, is also possible for the installation of a cellular DECT/GAP multisystem CMI. A number of the base stations BS arranged in the open-plan office are designed here, in contrast to the base stations according to WO 95/10764 shown in FIGS. 1 and 2, as antenna diversity base stations. The concentration of the DECT/GAP systems DGS is so marked here (uninterrupted radio coverage of the geographical location), that individual DECT/GAP systems DGS operate in the same area as a result of the overlapping cellular DECT/GAP radio cells FB.

Depending on the degree of overlapping, the same area may mean here that a) a first base station BS1 of, [. . . ] preferably a first DECT/GAP system DGS1 is arranged in a first radio cell FB1 and a second base station BS2 of a second system DGS2 is arranged in a second radio cell FB2 and can set up telecommunications connections to at least one mobile part $MT_{1,2}$, b) a third base station BS3 of a third DECT/GAP system DGS3 and a fourth base station BS4 of a fourth DECT/GAP system DGS4 are arranged in a common third radio cell FB3 and can set up telecommunications connections to at least one mobile part $MT_{3,4}$. According to the publication, "Presentation of A. Elberse, M. Barry, G. Fleming on the topic, "DECT Data Services—DECT in Fixed and Mobile Networks", Jun. 17/18 1996, Hotel Sofitel, Paris, pages 1 through 12 and Summary, the cordless telecommunication scenario shown in FIGS. 1 through 4, wherein DECT mobile parts are connectable via a DECT air interface to a private (residential) DECT base station FIG. 1) or, respectively, to one or more private or public DECT base stations (FIG. 4), can be expanded to the effect that the DECT mobile parts are connectable via the DECT air interface to private and public DECT base stations.

According to WO 95/05040 (see FIGS. 3 through 8 with the respectively appertaining description) this scenario can, in turn, be expanded in view of a "Universal Mobile Telecommunication System" (UMTS) to the effect that picocell-related cordless telecommunication systems (for example, the previously discussed DECT systems) be linked under CTM points of view (Cordless Terminal Mobility; see ETSI Publications (1): "IN Architecture and Functionality for the support of CTM", Draft Version 1.10, September 1995; (2). "Cordless Terminal Mobility (CTM)—Phase 1, Service Description", Draft DE/NA-010039, Version Oct. 6, 2, 1995) into a higher-ranking network infrastructure (for example, ISDN, PSTN, GSM and/or satellite networks) for accesses (see ETSI Publications "CTM Access Profile (CAP)", prETS 300824, November 1996). According to patent claim 1 of WO95/05040, this can be achieved by a DECT base station fashioned as DECT repeater. In a universal mobile telecommunication system, DECT is mainly understood as a "network access technology" for mobile communication services (see Presentation of A. Elberse, M. Barry, G. Fleming on the topic, "DECT Data Services—DECT in Fixed and Mobile Networks", Jun. 17/18 1996, Hotel Sofitel, Paris, pages 1 through 12 and Summary) and not as a network.

Standing for the above-presented scenario, FIG. 5 (proceeding from the publications "Nachrichtentechnik Elektronik, Berlin 45 (1995) No. 1, pages 21 through 23 and No. 3, pages 20 and 30" as well as IEE Colloquium 1993, 173; (1993), pages 29/1–29/7; W Hing, F. Halsall, "Cordless access to the ISDN basic rate service" on the basis of a DECT/ISDN Intermediate Systems DIIS according to the ETSI Publication prETS 300822, February 1997) shows an "ISDN⇔DECT Telecommunication scenario ID-TSZ (Integrated Services Digital Network⇔Digital Enhanced Cordless Telecommunication) with an ISDN telecommunication network I-TKN [see the publication "Nachrichtentechnik Elektronik, Berlin 41–43, Part: 1 through 10, P1: (1991) No. 3, pages 99 through 102; P2: (1991) No. 4, pages 138 through 143; P3: (1991) No. 5, pages 179 through 182 and No. 6, pages 219 through 220; P4: (1991) No. 6, pages 220 through 222 and (1992) No. 1, pages 19 through 20; P5: (1992) No. 2, pages 59 through 62 and (1992) No. 3, pages 99 through 102; P6: (1992) No. 4, pages 150 through 33; P9: (1993) No. 2, pages 65 through 97 and (1993) No. 3, pages 129 through 135; P10: (1993) No. 4, pages 187 through 190"] and a DECT telecommunication system D-TKS connected to the ISDN telecommunication network I-TKN.

As to be explained in greater detail later, the DECT telecommunication system D-TKS can thereby be a component part of a DECT/ISDN intermediate system DIIS or, respectively, of an RLL/WLL telecommunication sub-system RW-TTS. The DECT telecommunication system and, thus, the DECT/ISDN intermediate system DIIS or, respectively, the RLL/WLL telecommunication sub-system are preferably bases on a DECT/GAP system DGS as shown, for example, in FIG. 1.

Alternatively, the DECT/ISDN intermediate system DIIS or, respectively, the RLL/WLL telecommunication sub-system RW-TTS also can be based on a GSM system (Groupe Spéciale Mobile or Global System for Mobile communication; see Informatik Spektrum 14 (1991) June, No. 3, Berlin, DE; A. Mann, "Der GSM-Standard—Grundlage für europäische Mobilfunknetze", pages 137 through 152). Instead, it is also possible in the framework of a UMTS scenario that the ISDN telecommunication network I-TKN is fashioned as GSM network or as PSTN network (Public Switched Telecommunications Network).

Coming into consideration over and above this as further possibilities for the implementation of the DECT/ISDN intermediate system DIIS or, respectively, RLL/WLL telecommunication sub-system RW-TTS or of the ISDN telecommunication network I-TKN are the initially cited systems/networks that are based on the known multiple access methods FDMA, TDMA, CDMA (Frequency Division Multiple Access, Time Division Multiple Access, Code Division Multiple Access) and hybrid multiple access methods formed therefrom.

The employment of radio channels (for example, DECT channels) in classic, line-bound telecommunication systems such as the ISDN (for example, RLL/WLL scenario) is gaining in significance, particularly as viewed in front of the background of future, alternative network operators without their own complete wire network. For example, the wireless connection technology RLL/WLL (Radio in the Local Loop/Wireless in the Local Loop) given the RLL/WLL telecommunication sub-system RW-TTS, should make ISDN services available to the ISDN subscriber at standard ISDN interfaces; for example, upon involvement of the DECT system DS (see FIG. 4).

In the "ISDN⇔DECT telecommunication scenario ID-TSZ of FIG. 4, a first telecommunication subscriber (user) TCU1 (Tele-Communication User) has his terminal equipment TE (Terminal Endpoint; Terminal Equipment) linked into the ISDN world with the services available therein, for example via a standardized S-interface (S-BUS), the DECT/ISDN intermediate system DIIS (preferably DECT-specific and contained in the RLL/WLL telecommunication sub-system RW-TTS) fashioned as local message transmission loop, a further standardized S-interface (S-BUS), a network termination NT (Network Termination) and a standardized U-interface of the ISDN telecommunication network I-TKN, as is, on the other hand, a second telecommunication user TCU2 as ultimate user of the DECT/ISDN intermediate system DIIS.

The DECT/ISDN intermediate system DIIS is primary composed of two telecommunication interfaces, a first telecommunication interface DIFS (DECT Intermediate Fixed System) and a second telecommunication interface DIPS (DECT Intermediate Portable System) that are wirelessly connected to one another; for example, via a DECT air interface. Due to the quasi location-bound first telecommunication interface DIFS, the DECT/ISDN intermediate system DIIS forms the local message transmission loop defined above in this context. The first telecommunication interface DIFS contains a radio fixed part RFP (Radio Fixed Part), an interworking unit IWU1 (InterWorking Unit) and an interface circuit INC1 (INterface Circuitry) to the S-interface. The second telecommunication interface DIPS contains a radio portable part RPP (Radio Portable Part), an interworking unit IWU2 (InterWorking Unit) and an interface circuit INC2 (INterface Circuitry) to the S-interface. The radio fixed part RFP and the radio portable part RPP thereby form the known DECT/GAP system DGS.

As already mentioned, FIG. 5 (as typical RLL/WLL scenario) first shows how the DECT/ISDN intermediate system DIIS is linked into the ISDN telecommunication network I-TKN as local message transmission loop in the framework of the RLL/WLL telecommunication sub-system RW-TTS and second, how the DECT/ISDN intermediate system DIIS is connected to the ISDN telecommunication network I-TKN only at the network side from CAP points of view (Cordless terminal mobility Access Profile). In the $2^{nd}$ possibility, the interface circuit INC2 of the second telecommunication interface DIPS to the S-interface is not active or not even present at all. In order to graphically show this situation overall and substantiate it, the interface circuit INC2 of the second telecommunication interface DIPS is shown with broken lines. Whereas the second telecommunication interface DIPS in the $1^{st}$ possibility is not fashioned, for example, mobile part-specifically; i.e., with user interface. The second telecommunication interface DIPS in the $2^{nd}$ possibility is fashioned as typical mobile part with a user interface. For example, the procedure described below is provided for the setup of telecommunication connections between the base station/stations BS and the mobile parts MT in the DECT systems according to FIGS. 1 through 5 pursuant to the DECT standard.

Given an "on-air subscription", i.e. the logon of a DECT mobile part or other DECT terminal at a corresponding DECT base station over the "air", mobile part, terminal and base station are previously brought into a logon-ready condition. When the base station is brought into the logon-ready condition on the basis of an operator procedure, then it broadcasts this by setting the "high layer capability" bit "a-44" [see ATSI Publication ETS 300 175-5, October 1992, Annex F].

This occurs in that the base station BS (Radio Fixed Part RFP) according to FIGS. 1 through 5 sends broadcast information via the DECT air interface at regular time intervals on simplex transmission paths-what are referred to as dummy bearers. These broadcast information being received by the mobile part MT (Radio Portable Part RPP) according to FIGS. 1 through 5 and serving this mobile part MT for the synchronization and the connection setup with the base station. The broadcast information need not necessarily be sent on a dummy bearer.

It is also possible that no dummy bearer is present because the base station is already maintaining at least one telecommunication connection, what is referred to as a traffic bearer, to another mobile part and then sends the necessary broadcast information on this. In this case, the mobile part MT, RPP that would like to have a telecommunication connection to the base station BS, RFP can receive the broadcast information as in the case of transmission of the broadcast information on the dummy bearer. According to ETSI Publication ETS 300175-3, October 1992, Chapter 9.1.1.1, the broadcast information contains information about access rights, system information and paging information.

The mobile part, terminal MT, RPP, scans for base stations BS, RFP that have set this bit "a44" and, after a successful search or, respectively, after a successful scan procedure, sets up a radio connection to this base station BS, RFP.

The connection setup by the mobile part MT, RPP occurs according to the rules of channel selection (see ETSI Publication ETS300175-5, October 1992, Chapter 9, and, in particular, Chapter 9.3), in accord wherewith a new channel is selected for the setup of a new connection and a connection request (CC-SETUP) is delivered to the base station BS, RFP.

If more than one base station has simultaneously set these "a44" bit and, as described, broadcast, then the probability is great that an incorrect base station for which the mobile part MT, RPP has no access authorization will be selected by the mobile part MT, RPP and, accordingly, the logon miscarries. This result of a logon attempt of the mobile part or, respectively, terminal MT, RPP at the base station BS, RFP particularly occurs where, for example, private base stations and public base stations are adjacent or, respectively, private systems/private networks/radio cells of the private base stations and public systems/public networks/radio cells of the public base stations overlap (see FIG. 6).

FIG. 6 shows, for example, a first radio cell FZ1 of a private base station (residential base station) R-BS and a second radio cell FZ2 of a public base station P-BS that overlaps/intersect. In this overlap or, respectively, intersection area (area shaded diagonally upward), for example, a private mobile part (residential mobile) part R-MT is located.

In the illustrated embodiment, the user of the mobile part R-MT attempts to log his handset on at his private base station R-BS, for example according to the DECT standard on the basis of mutual transmission of radio messages RM between the mobile part R-MT and the base station R-BS. Moreover, the public base station P-BS to which there is also the indicated radio traffic is attached to a light pole LM.

Whereas the private base station R-BS sends the "a44" bit in the radio message FN in order to indicate that it is ready to log on, the same bit is also sent for the same purpose by the public base station P-BS. Since the public base station P-BS constantly emits the "a44" bit, this is always ready to log on by definition. This results therein that the user of the private mobile part R-MT may potentially attempt in vain to log his handset on at the private base station and ultimately gives up.

As an alternative to the described case, to wit that the mobile part R-MT is located in the overlap or, respectively, intersection area of the two radio cells FZ1, FZ2, it is also possible that a further (smaller) overlap or, respectively, intersection area (area shaded diagonally up and down) arises as a result of further radio cells. For example, a third radio cell FZ3 arises with a further public base station P-BS arranged therein and a fourth radio cell FZ4 arises likewise having another public base station P-BS arranged therein, the mobile part R-MT being capable of receiving the radio messages FN with the "a44" bits therein from said base stations R-BS, P-BS.

Mobile parts that are currently commercially available are fashioned, for example, such that a number of transmitting base stations are sought in a first step S1, and that, in a second step S2, the one having the highest field strength is then taken for the logon attempt of the mobile part, wherein the field strength serves as reception criterion for the selection (sec FIG. 7). Alternatively, however, other reception criteria also are possible for the selection such as, for example, CRC values or a combination of CRC values and field strength values.

In a following, third step S3, the mobile part checks whether the base station selected in this way has set the "a44" bit and, as described, broadcasts over the "air". When this is the case, then the logon (subscription) is started according to ETS-Publication ETS300175-5, October 1992, Chapter 3; see German Patent Application 19643658, which does not enjoy prior publication.

When this is not the case, then the selected base station is marked as "invalid" in a fifth step S5 and, subsequently, that base station of the transmitting base stations having the highest field strength is taken in the second step S2 for a further logon attempt of the mobile part; viewed overall, thus, the next-strongest base station. What this is intended to achieve is that the handset always finds the closest base station. Since public base stations, however, usually work directional antennas, it is never possible (given a scenario as illustrated in FIG. 6) to log the handset on at the private base station R-BS.

There are currently three possible methods in order to counter the technical problem that has been set forth:

i) In the private domain, the problem can be alleviated in that the private base station beams out the "a44" bit only for a limited time, for example 30 seconds, after activation of the logon procedure. In this way, the user can designationally logon in this limited time window; this method, however, cannot be used for the above-described scenario.

ii) Evaluation of the field strength. A plurality of base stations are found, wherein the base station having the highest field strength is sought out. In the above-described scenario, this leads to continuous miscarries of the logon.

iii) Application of the message "manual input of the PARK identifier" Manual entry of PARK). The identity of the base station is, thereby, input into the handset by the user; the handset intentionally seeks only for this base station. This method, however, is not utilized in the illustrated scenario because the user does not even know the identity of the base station.

The object of the present invention lies in improving the subscription of telecommunication devices at cooperating stations connectable to the telecommunication devices by wireless telecommunication in wireless telecommunication systems, particularly DECT mobile parts at DECT base stations in DECT systems, such that the probability that the telecommunication devices, particularly the DECT mobile parts, can be logged on designationally at an intended cooperating station is increased from a respective plurality of simultaneously logon-ready cooperating stations, particularly the DECT base stations.

SUMMARY OF THE INVENTION

The idea underlying the present invention lies in subscribing telecommunication devices at cooperating stations connectable to the telecommunication devices on the basis of wireless telecommunication in wireless telecommunication systems of the species initially outlined, particularly DECT mobile parts at DECT base stations in DECT systems, such that all base stations sending receiving (found) radio messages that have set the "a44" bit and transmitted it are, for example, stored in the mobile part as hitherto, and a known logon procedure is implemented with a base station selected according to predetermined reception criteria. When this logon procedure miscarries, then this base station, for example, is marked "invalid" in a list and the same procedure, including the logon procedure, is implemented with a different base station.

What is thereby utilized is that a PIN word (personal identify number) and/or an AC word (Authentication Code) is interrogated in the logon. When the PIN word/AC word is incorrect, then the logon attempt is rejected.

Otherwise, when the PIN word/AC word is correct, the mobile part has successfully logged on at the base station.

The expansion compared to the prior methods (FIG. 7) is shown in FIG. 8. The outlay deriving with the embodiment thereof is far, far higher than one may expect at first sight because, according to the DECT air interface protocol, the DECT protocol layer "3" also is involved in the log on repetition in addition to the DECT protocol air "2".

Dependent on how many base stations sending the radio messages are received by the mobile part, it can last rather long under certain circumstances until a log on procedure has been successfully terminated. This time definitely can be unacceptable for a user. It is therefore advantageous that the time duration for a subscription can be set by the user or, respectively, is predetermined by the system.

Additional features and advantages of the present invention are described in, and will be apparent from, the Detailed Description of the Preferred Embodiments and the Drawings.

DESCRIPTION OF THE DRAWINGS

FIG. 1 shows an illustration of a setup at a DECT/GAP base station according to the DECT/GAP standard;

FIG. 4 shows a cellular DECT/GAP multisystem;

FIG. 7 shows an illustration of a number of transmitting base stations wherein the one having the highest field strength is selected for a logon attempt of a mobile part; and FIG. 8 shows an exemplary embodiment of the present invention which is an expanded logon method for subscription of DECT mobile parts at DECT base stations.

DETAILED DESCRIPTION OF THE PREFERRED EMBODIMENTS

Proceeding from FIG. 7, FIG. 8 shows an expanded logon method for subscription of, for example, DECT mobile parts R-MT at, for example, DECT base stations R-BS, P-BS. The two methods particularly differ in that an interrogation is made in a sixth step S6 given the log on method according to FIG. 8 to see whether a PIN word (personal identity number) and/or AC word (authentication code) input at the mobile part is incorrect or correct.

When the PIN word and/or AC word is incorrect, then the selected base station is marked as "invalid" in the fifth step S5, and that base station among the transmitting base stations that has the highest field strength (the next-strongest base station, thus, viewed overall )was subsequently taken in the second step S2 for a further logon attempt of the mobile part. When, by contrast, the PIN word and/or AC word is correct, then the logon procedure has been ended and the mobile part is logged on at the base station.

Dependent on how many base stations R-BS, P-BS sending the radio messages are received by the mobile part R-MT, it can last rather long under certain circumstances until a log on procedure has been successfully ended. This time definitely can be unacceptable to the user.

Figure 2:
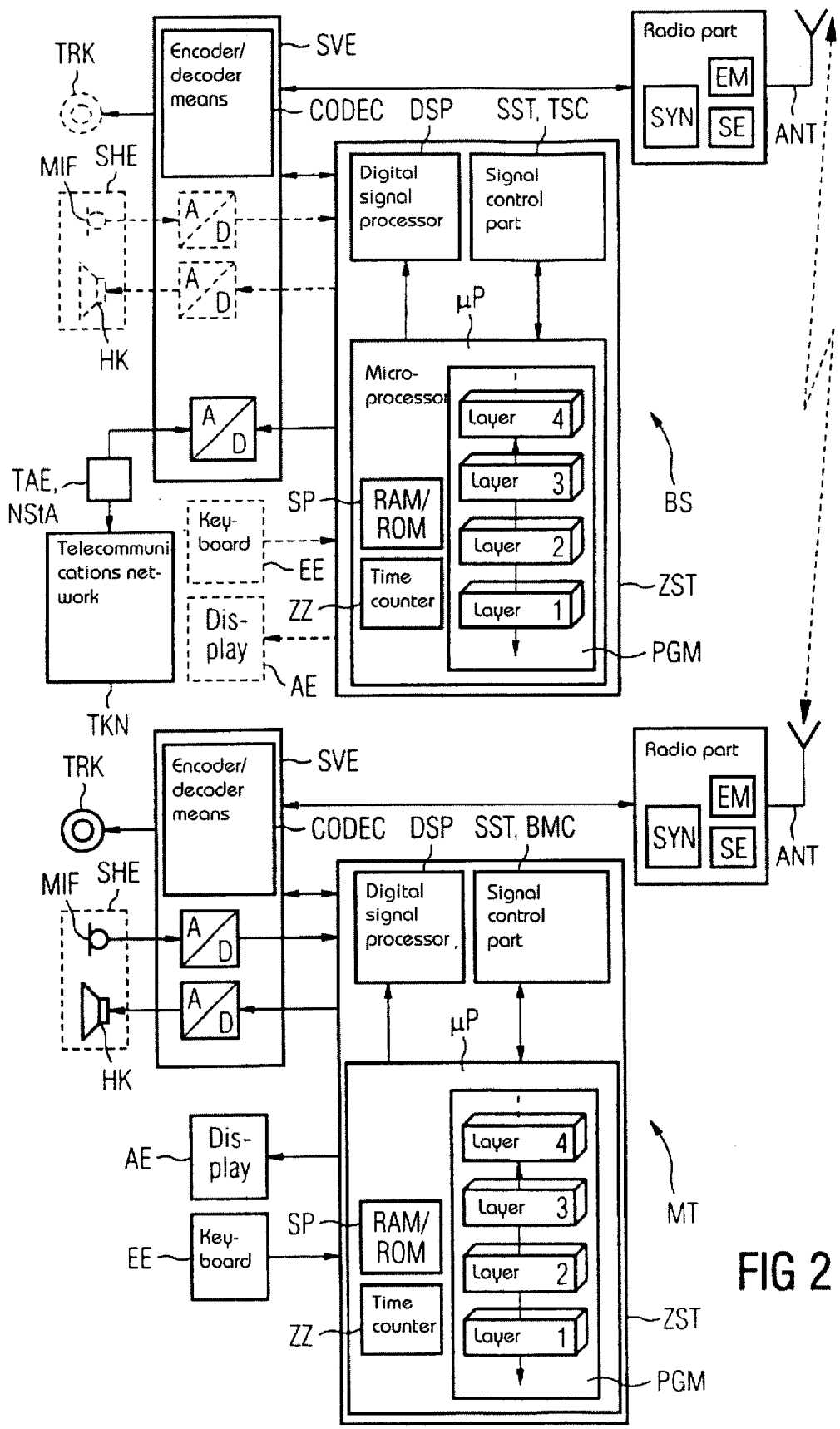
FIG. 2 shows an illustration of the basic circuit design of a base station and a mobile part.
Figure 3:
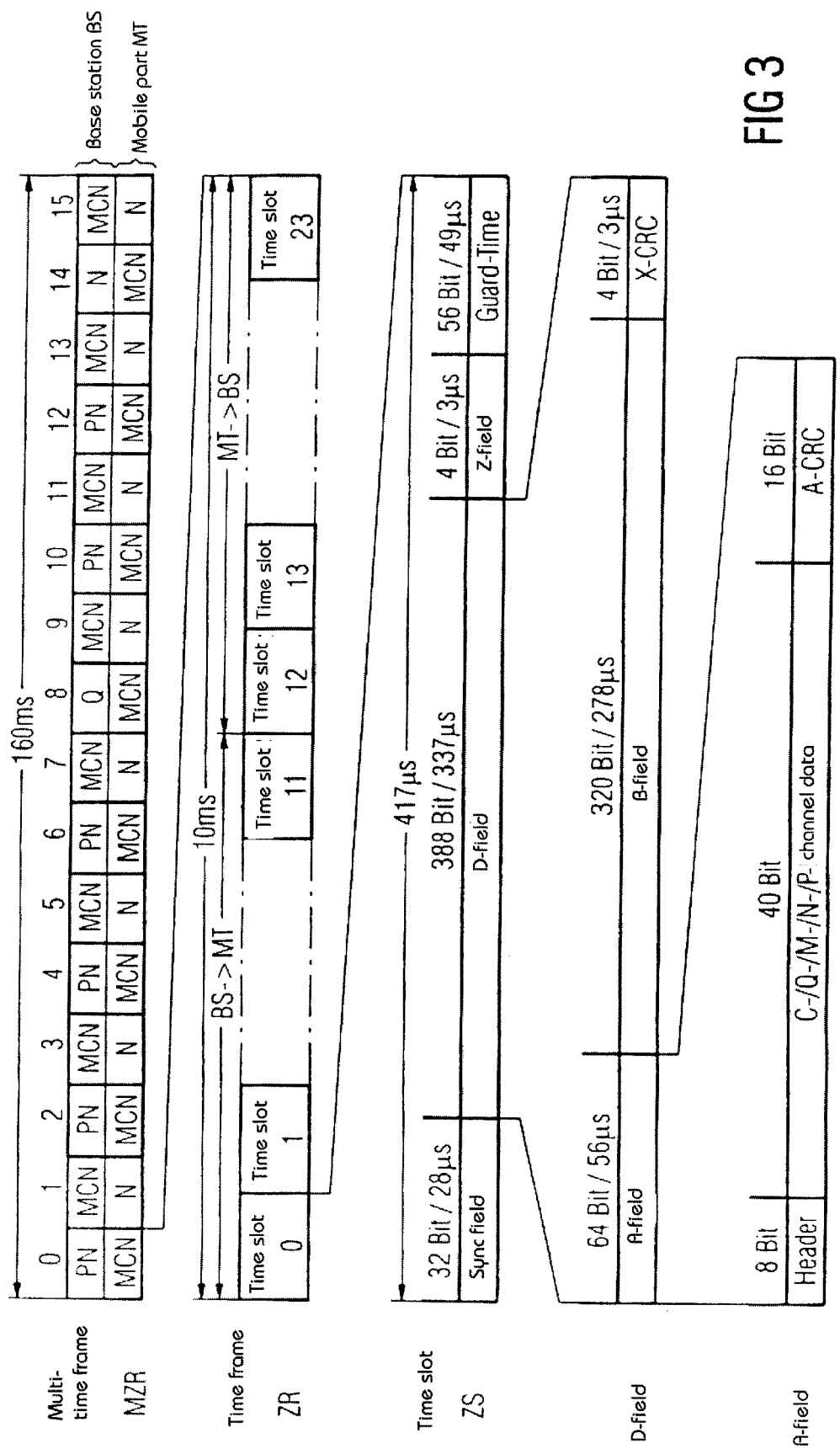
FIG. 3 shows an illustration of the TDMA structure of the DECT/GAP system.
Figure 5:
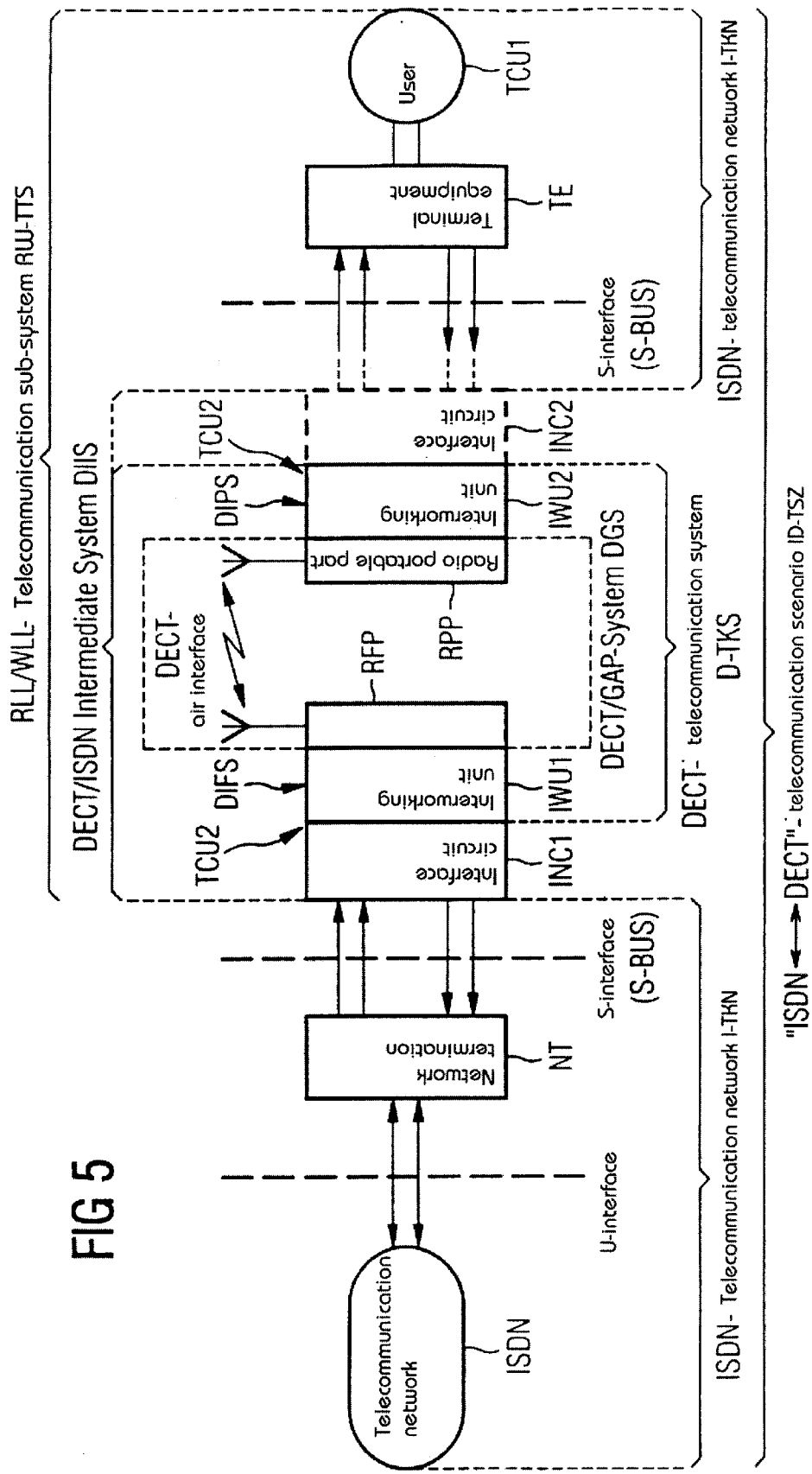
FIG. 5 shows an illustration of an ISDN-DECT telecommunication scenario with an ISDN telecommunication network.
Figure 6:
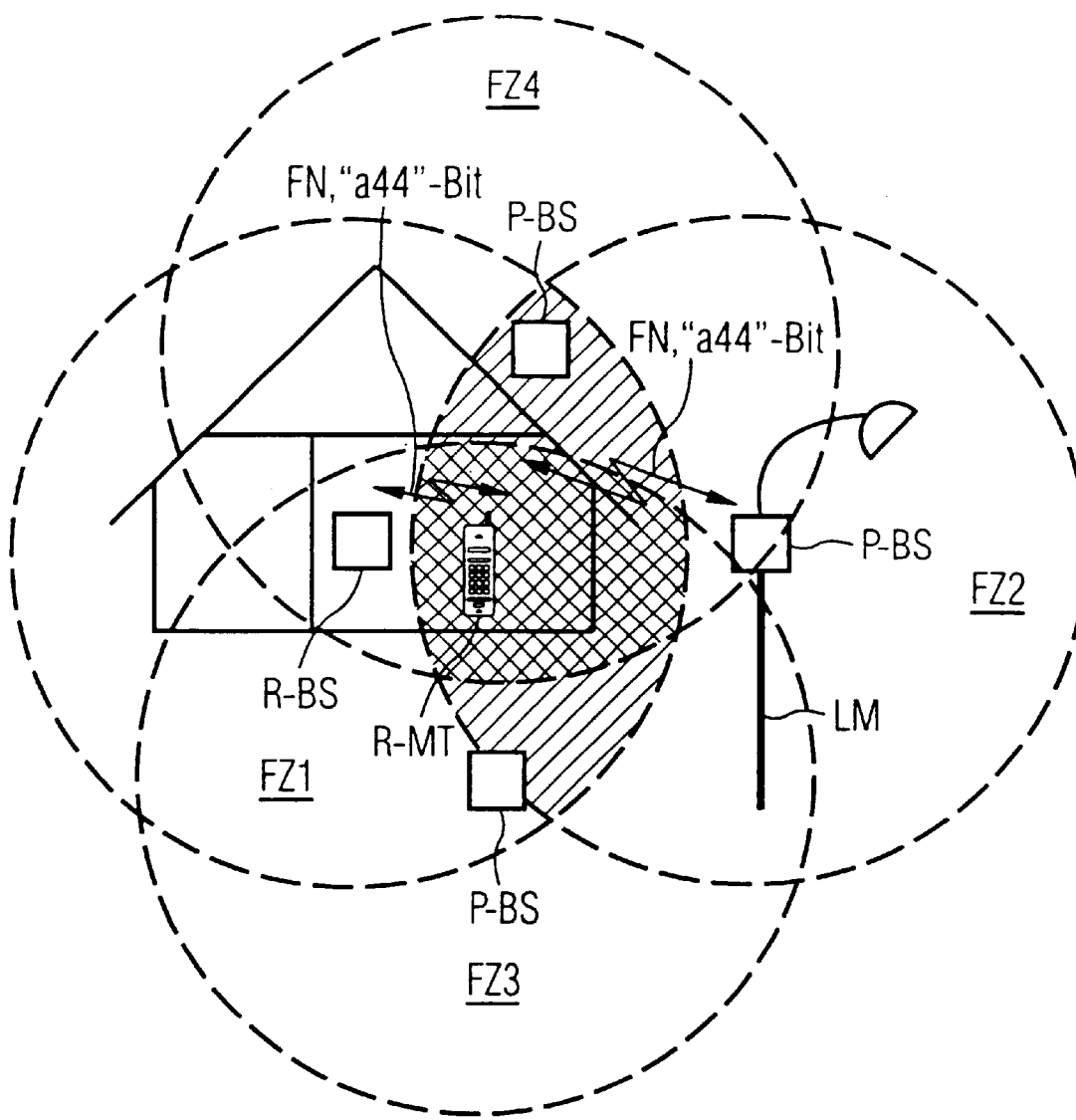
FIG. 6 shows an example of the first radio cell of a private base station and a second radio cell of a public base station which overlap.

Based on FIG. 2, a time counter ZZ is therefore present, particularly in the mobile part R-MT. This time counter ZZ fashioned in a traditional way can be loaded with a defined time duration by the user via the user interface (can be set) and/or can be prescribed by the system via the base station R-BS, P-BS that, for this purpose, likewise includes a time counter ZZ or, respectively, a memory SP based on FIG. 2, and can be stored intermediately in a memory SP of the mobile part R-MT.

The memory SP in the mobile part, over and above this, also serves the purpose of storing the receiving (found) base stations on the basis of base-station-specific information and of storing the base stations marked as invalid for the logon procedures shown in FIGS. 7 and 8.

Although the present invention has been described with reference to specific embodiments, those of skill in the art will recognize that changes may be made thereto without departing from the spirit and scope of the invention as set forth in the hereafter appended claims.

I claim:

1. A method for subscribing telecommunication devices at cooperating stations connectable to the telecommunication devices by wireless communication in wireless telecommunication systems, the method comprising the steps of:

searching, via the telecommunication devices, for primary cooperating stations at their locations in the wireless telecommunication systems from which transmitted messages are received;

determining, via the telecommunication devices, at least first primary cooperating stations on the basis of location-specific reception criteria from among the primary cooperating stations, whereat the telecommunications devices attempt to log on;

checking, via the telecommunication devices, whether first information is contained in the transmitted messages;

attempting, via the telecommunication devices when the checks show that the first information is not present, to log on to different first primary cooperating stations other than the first primary cooperating stations already checked;

starting, via the telecommunication devices, predetermined subscription procedures for subscribing at the checked, first primary cooperating stations when the checks show that the first information is present;

sending, via the telecommunication devices, second information during the course of the subscription procedures to be checked, first primary cooperating stations, with which the subscription authorizations of the telecommunication devices are identified at the checked, first primary cooperating stations;

logging on the telecommunications devices at the checked, first primary cooperating stations when the second information is correct for logon at the checked, first primary cooperating stations; and attempting to synchronize onto first primary cooperating stations other than the first primary cooperating stations already checked the telecommunications devices when the second information for logon at the checked, first primary cooperating stations is not correct.

2. A method for subscribing telecommunication devices at cooperating stations connectable to the telecommunication devices by wireless telecommunication in wireless telecommunication systems as claimed in claim 1, the method further comprising the step of:

prescribing a subscription time duration for the subscribing of the telecommunication device at the first primary cooperating stations.

3. A method for subscribing telecommunication devices at cooperating stations connectable to the telecommunication devices by wireless telecommunication in wireless telecommunication systems as claimed in claim 1, wherein the method has application in DECT systems, such that the telecommunication devices are DECT devices and the cooperating stations are DECT base stations and DECT repeaters.

4. A method for subscribing telecommunication devices at cooperating stations connectable to the telecommunication devices by wireless telecommunication in wireless telecommunication systems as claimed in claim 3, wherein the DECT devices are DECT mobile parts of DECT network termination devices.

5. A method for subscribing telecommunication devices at cooperating stations connectable to the telecommunication devices by wireless telecommunication in wireless telecommunication systems as claimed in claim 3, wherein the messages are DECT air interface-specific protocol messages.

6. A method for subscribing telecommunication devices at cooperating stations connectable to the telecommunication devices by wireless telecommunication in wireless telecommunication systems as claimed in claim 3, wherein the location-specific reception criterion is formed of at least one of field strength and SRC values.

7. A method for subscribing telecommunication devices at cooperating stations connectable to the telecommunication devices by wireless telecommunication in wireless telecommunication systems as claimed in claim 5, wherein the first information is NWK/DLC protocol layer related bit information that is transmitted in MAC layer broadcast messages.

8. A method for subscribing telecommunication devices at cooperating stations connectable to the telecommunication devices by wireless telecommunication in wireless telecommunication systems as claimed in claim 3, wherein the second information is a PIN word.

9. A method for subscribing telecommunication devices at cooperating stations connectable to the telecommunication devices by wireless telecommunication in wireless telecommunication systems as claimed in claim 3, wherein the second information is an AC word.

10. A method for subscribing telecommunication devices at cooperating stations connectable to the telecommunication devices by wireless telecommunication in wireless telecommunication systems as claimed in claim 1, wherein the method has application in GSM networks such that the telecommunication devices are GSM devices, and the cooperating stations are GSM base stations with allocated, central switching equipment.

11. A method for subscribing telecommunication devices at cooperating stations connectable to the telecommunication devices by wireless telecommunication in wireless telecommunication systems as claimed in claim 1, wherein the method has application in networks that are hybrid with respect to CDMA multiple access methods, FDMA multiple access methods, and TDMA multiple access methods such that the telecommunication devices are hybrid devices and the cooperating stations are hybrid base stations.

* * * * *